United States Patent
Hendricks et al.

(10) Patent No.: US 10,843,754 B2
(45) Date of Patent: Nov. 24, 2020

(54) CAN-AM SPYDER F3® SEAT BACK/TRUNK EXTENSION

(71) Applicants: Robert Foster Hendricks, Vale, OR (US); Connie Jean Hendricks, Vale, OR (US)

(72) Inventors: Robert Foster Hendricks, Vale, OR (US); Connie Jean Hendricks, Vale, OR (US)

( * ) Notice: Subject to any disclaimer, the term of this patent is extended or adjusted under 35 U.S.C. 154(b) by 0 days.

(21) Appl. No.: 16/195,650

(22) Filed: Nov. 19, 2018

(65) Prior Publication Data
US 2019/0152550 A1 May 23, 2019

Related U.S. Application Data

(60) Provisional application No. 62/587,718, filed on Nov. 17, 2017.

(51) Int. Cl.
| | | |
|---|---|---|
| *B62J 1/08* | (2006.01) | |
| *B62J 1/12* | (2006.01) | |
| *B62K 5/02* | (2013.01) | |
| *B62J 1/28* | (2006.01) | |
| *B62K 5/027* | (2013.01) | |
| *B62J 9/20* | (2020.01) | |
| *B62J 7/04* | (2006.01) | |

(52) U.S. Cl.
CPC . *B62J 1/08* (2013.01); *B62J 1/12* (2013.01); *B62J 1/28* (2013.01); *B62J 9/20* (2020.02); *B62K 5/027* (2013.01); *B62J 7/04* (2013.01)

(58) Field of Classification Search
CPC ......... B62J 1/00; B62J 1/08; B62J 1/12; B62J 1/28; B62J 7/02; B62J 7/04; B62J 9/001; B62J 9/006; B62J 9/20; B62K 5/027; B62K 5/05; B62K 19/46
See application file for complete search history.

(56) References Cited

U.S. PATENT DOCUMENTS

| | | | |
|---|---|---|---|
| 3,549,172 A | 12/1970 | McBroom et al. | |
| 3,822,917 A | 7/1974 | George | |
| 3,850,353 A | 11/1974 | Foulds | |
| 4,195,757 A * | 4/1980 | Jefferson | F25D 3/06 224/414 |
| 4,266,703 A | 5/1981 | Litz | |
| 4,563,038 A | 1/1986 | Hirose | |
| 5,441,330 A | 8/1995 | Rojas | |
| 5,518,291 A | 5/1996 | Shaide | |
| 5,931,360 A * | 8/1999 | Reichert | B62J 7/04 224/413 |
| 6,484,914 B1 * | 11/2002 | Willey | B62J 1/28 224/413 |
| 6,767,053 B1 | 7/2004 | Crounse | |
| 6,968,917 B2 | 11/2005 | Rondeau et al. | |

(Continued)

*Primary Examiner* — Ryan D Kwiecinski
(74) *Attorney, Agent, or Firm* — Scott D. Swanson; Shaver & Swanson, LLP

(57) ABSTRACT

A seat back/trunk extension device having a mechanism for attaching to the frame of a Can-Am Spyder F3®. The device attaches to the frame and creates a platform at the rear of the frame, positioning the trunk in a rear location. The device has primarily three pieces that extends towards the rear and supports the trunk. The device has an attachment that extends the passenger seat cushion, to provide additional room for a passenger.

10 Claims, 8 Drawing Sheets

(56) References Cited

U.S. PATENT DOCUMENTS

| | | | | |
|---|---|---|---|---|
| 7,070,234 B1* | 7/2006 | Pravettone | ............... | B62J 1/28 |
| | | | | 297/215.12 |
| 7,390,046 B2 | 6/2008 | Ostroski et al. | | |
| 7,621,362 B2* | 11/2009 | Ogawa | ............... | B62J 1/08 |
| | | | | 180/219 |
| 8,757,713 B2* | 6/2014 | Reinhardt | ............... | B62J 9/20 |
| | | | | 297/215.12 |
| 8,882,128 B2* | 11/2014 | Komatsu | ............... | B62J 9/20 |
| | | | | 280/288.4 |
| 8,985,416 B2* | 3/2015 | Schanz | ............... | B62J 11/00 |
| | | | | 224/413 |
| 2009/0001113 A1* | 1/2009 | Butkiewicz | ............... | B62J 7/04 |
| | | | | 224/413 |
| 2010/0243691 A1* | 9/2010 | Salisbury | ............... | B62J 1/12 |
| | | | | 224/413 |
| 2011/0139843 A1* | 6/2011 | Thomas | ............... | B62J 1/28 |
| | | | | 224/413 |
| 2014/0191006 A1* | 7/2014 | Schanz | ............... | B62J 7/04 |
| | | | | 224/413 |
| 2014/0209650 A1* | 7/2014 | Hughes | ............... | B60R 11/00 |
| | | | | 224/557 |
| 2016/0023704 A1* | 1/2016 | Kitayama | ............... | B62J 9/20 |
| | | | | 224/433 |
| 2017/0341693 A1* | 11/2017 | Rzepecki | ............... | B62J 9/20 |
| 2018/0266148 A1* | 9/2018 | Bunyer | ............... | E05B 79/02 |

* cited by examiner

CAN-AM SPYDER F3® SEAT BACK/TRUNK EXTENSION

PRIORITY/CROSS-REFERENCE TO RELATED APPLICATIONS

This application claims the benefit of U.S. Provisional Application No. 62/587,718, filed Nov. 17, 2017, the disclosure of which is incorporated by reference.

TECHNICAL FIELD

The presently disclosed technology relates generally to seats and back support systems for riders of motorcycles, and more specifically to the seat and back support system for riders of a Can-Am Spyder F3®.

BACKGROUND OF THE INVENTION

The Can-Am Spyder® is a three-wheeled motorcycle that is becoming increasingly popular. The vehicle has two front wheels and a single rear drive wheel that has a similar layout to a modern snowmobile. The Can-Am Spyder® provides a more comfortable ride than a regular two-wheeled motorcycle, as the rider is able to rely on the two front wheels for additional balance. This added balance makes riding more comfortable allowing for the driver to travel longer distances. Although the Can-Am Spyder® has two front wheels, it utilizes a straddle type seat similar to that of a motorcycle or snowmobile.

There are multiple models of the Can-Am Spyder®. The F3 series is a "sport-cruising" model, with feet-forward upright seating, similar to a cruiser motorcycle. This F3 series comes in multiple trim packages as well.

The Can-Am Spyder F3® provides seating for a driver and a passenger to sit in a straddling position. However, the passenger seat can be uncomfortable for the passenger as there is little room between the backrest, the passenger's front side and the driver's backside. This tight fit can also make it less comfortable for the driver as well. With the seating arrangement uncomfortable for a two person ride, it negates the added advantage of a Can-Am Spyder F3® being comfortable for an extended drive.

What is needed is a seat extension that provides the passenger more room between the end of the seat and the driver. What is further needed is a seat extension that supports the weight of the trunk if extended proportionally with the extended seat.

SUMMARY OF THE INVENTION

Figure 1:
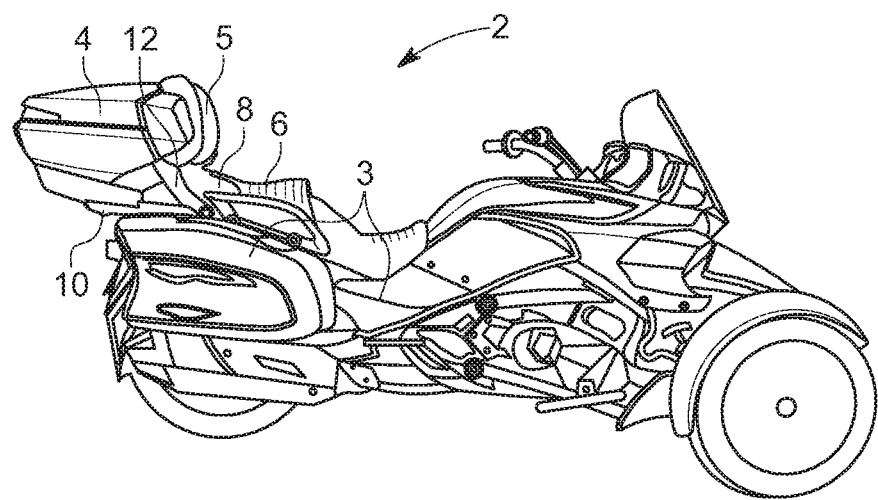
FIG. 1 is a side view of the Can-Am Spyder F3® with the seat back/trunk extension installed.

The purpose of the summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the inventive concept(s) of the application, which is measured by the claims, nor is it intended to be limiting as to the scope of the inventive concept(s) in any way.

What is disclosed herein is a seat extension device for a Can-Am Spyder F3® having three primary pieces. The first piece is a side arm mount that attaches to the existing trunk fork mount on the frame of the motorcycle just below the passenger seat. The second piece is a second side arm mount that attaches to the opposite side of the motorcycle as the first side arm mount. These two pieces are attached to a center mount toward the rear of the motorcycle that create a horizontal mount for the trunk and seat extension. The center mount is used as a tie plate to functionally connect the first side arm mount and the second side arm mount. The center mount and side arm mounts can have openings that allow for wire extensions to pass through to connect the rear of the motorcycle trunk to the previous existing connections such as to the battery. Each side arm mount has a first bolt hole for a new trunk fork mount that allows for the trunk attachment of the motorcycle to attach at a distance further away from the front of the motorcycle. Each side arm mount also has a second bolt hole that is used to bolt in the extended seat cushion, which fills in the gap created by the additional space created by the seat extension device that extends the trunk backwards. This provides the passenger with additional room for comfort. This second bolt hole is located between the opening for the trunk fork mount and the first bolt hole in the side arm mount.

The side arm mounts and center mount connect to form a three piece unit with the side arm mounts mounted on opposing trunk frame protrusions, and with the center mount interconnecting the two side arm mounts. A wire extension can be used to connect the battery to the trunk where the original connection powers a USB device in the trunk.

The three piece unit is bolted to the existing bolt holes on a factory Can-Am Spyder F3® used to bolt the trunk to the frame. The three piece unit is also bolted to the trunk using matching pre-existing bolt holes in a stock trunk used to bolt the trunk to the frame.

The seat extension constructed according to the teaching of this invention provides a convenient and easily operable means for extending the seat of the three-wheeled motorcycle to provide the passenger for additional comfort. The seat extension can be quickly installed and requires little instruction.

Still other features and advantages of the claimed invention will become readily apparent to those skilled in this art from the following detailed description describing preferred embodiments of the invention, simply by way of illustration of the best mode contemplated by carrying out my invention.

As will be realized, the invention is capable of modification in various obvious respects all without departing from the invention. Accordingly, the description of the preferred embodiments are to be regarded as illustrative in nature, and not as restrictive in nature.

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

With references to FIG. 1a, illustrated therein is a Can-Am Spyder F3® 2 with the seat/trunk extension device installed 10 for extending a passenger seat 6. The seat back/trunk extension device 10 is attached to and partly rests upon the frame 3. The trunk 4 is mounted on the seat/trunk extension device 10. The trunk 4 attaches to seat/trunk extension device 10 with the trunk fork arms 12. An added seat cushion 8 is attached behind the passenger seat 6 and below the passenger seat back 5. With the seat back/trunk extension device 10 installed, the trunk 4 sits back in a second position providing the passenger with additional space.

Figure 2:
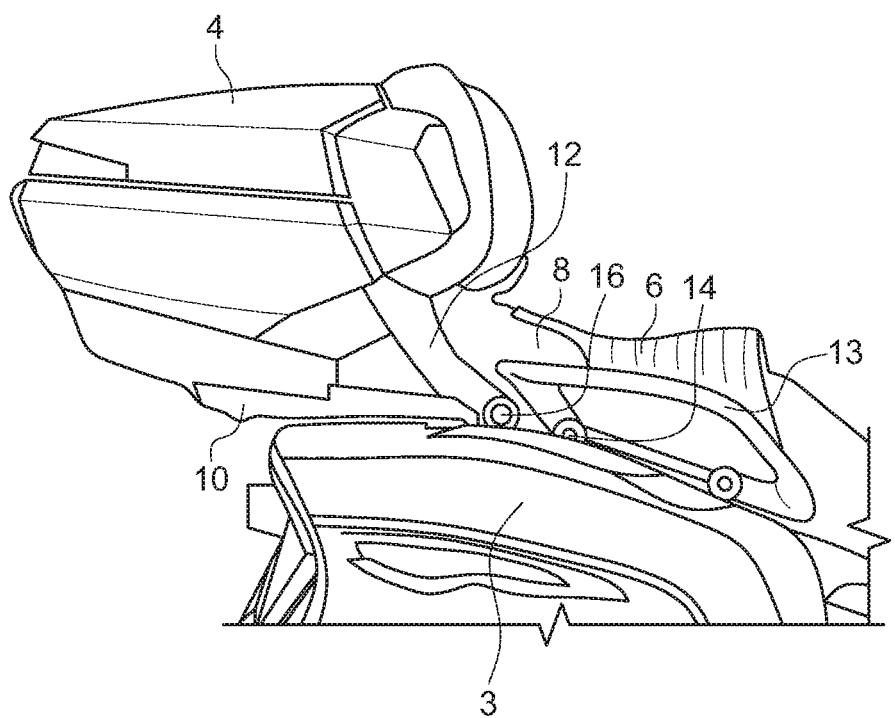
FIG. 2 is an exploded side view of the passenger seat and trunk with the seat back/trunk extension installed.

FIG. 2 illustrates a magnified view of the seat/trunk extension device 10 installed on the Can-Am Spyder F3® 2. The trunk fork arm 12 attaches to an appended protrusion 16, of which the appended protrusion 16 is attached to the side arm mounts 18, 20 of the seat/trunk extension device. The seat extension device 10 extends the trunk 4 to a second position preferably about 3.25 inches back from its original location on the frame and the passenger seat 6 is extended by a seat cushion 8. The frame 3 has frame protrusions 14 that are still capable of attaching the original passenger handle grips 13 when the seat back/trunk extension device 10 is installed.

Figure 3:
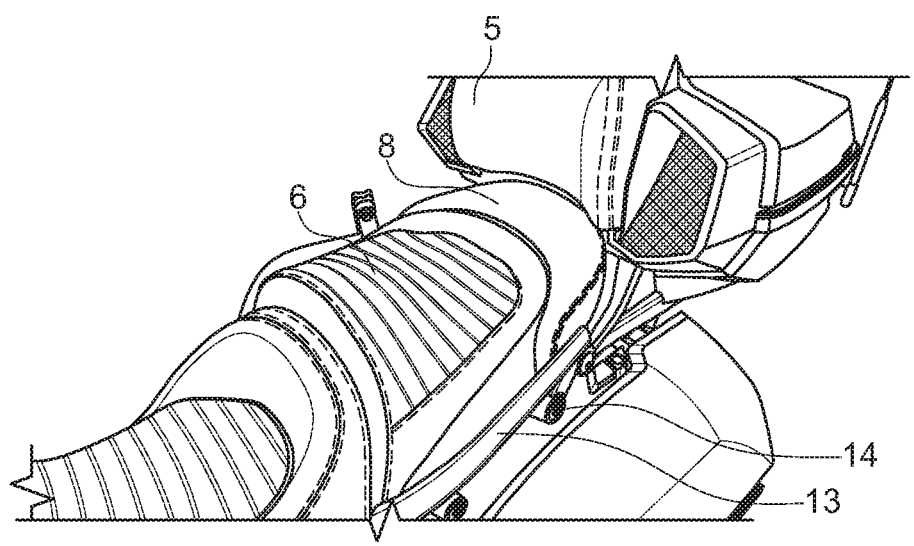
FIG. 3 is a perspective view of the passenger seat and trunk with the seat extension installed.

FIG. 3 illustrates a perspective view of the Can-Am Spyder F3® seat extension, which illustrates the added seat cushion 8 and the original handle grips 13 installed over the frame protrusion 14. The seat cushion 8 is configured to fit against the passenger seat 6 so as to provide a continuous cushion for a passenger. The seat cushion 8 is also configured to be a height so as to sit at the same level as the passenger seat 6 and rest below the seat back 5.

Figure 4A:
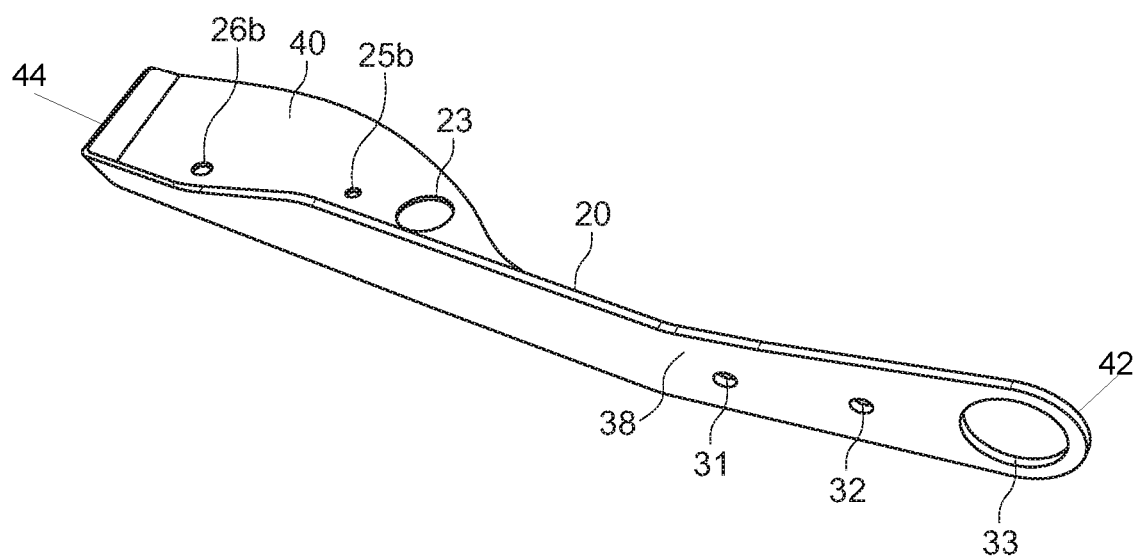
FIG. 4a is a bottom perspective view of the exterior side of a side arm mount.
Figure 4B:
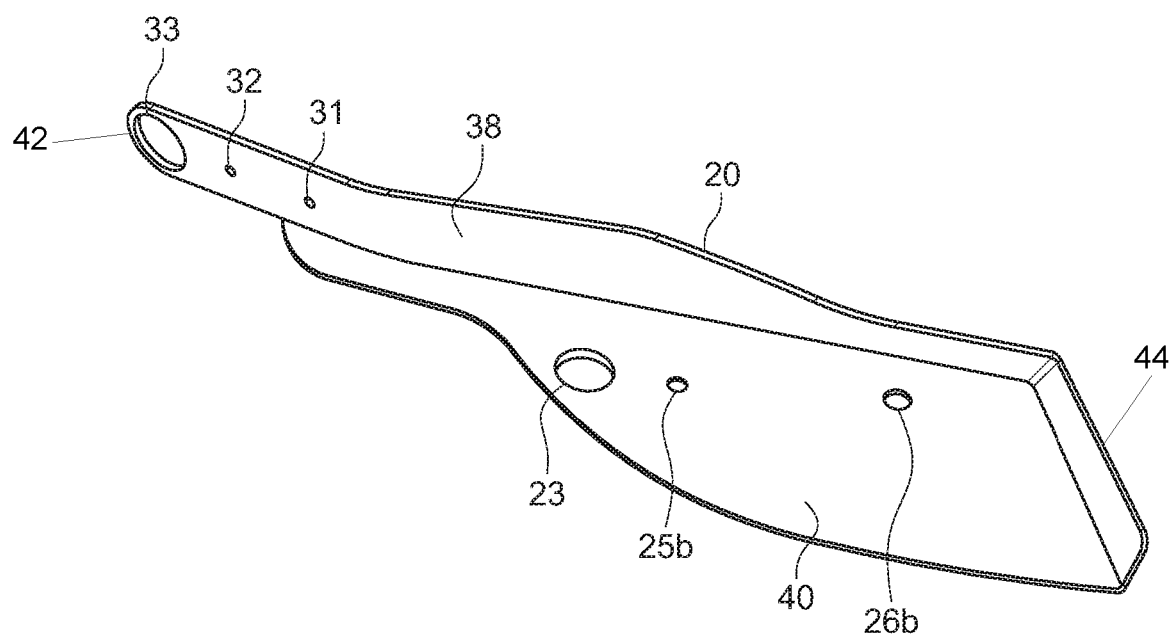
FIG. 4b is a bottom perspective view of the interior side of a side arm mount.

FIGS. 4a and 4b illustrate a side arm mount, specifically the second side arm mount 20. The side arm mounts 18, 20 are constructed to mirror each other. The side arm mount 20 has a first end 42 and a second end 44. The side arm mount 20 has a vertical portion 38 on the first end 42 and extends back to the second end 44. At the second end 44, a horizontal portion 40 extends inwards from the top of the vertical portion 38. The vertical portion 38 has a large opening 33 that is configured to attach to the frame protrusion 14. The vertical portion 38 also has a first bolt hole 31 and a second bolt hole 32, with the second bolt hole 32 being positioned between the first bolt hole 31 and the large opening 33. The horizontal portion 40 of the second side arm 20 has a wire opening 23 that is large enough for extension wires to pass through. The horizontal portion 40 also has a frame bolt hole 25b and a trunk bolt hole 26b.

In alternative embodiments, both the horizontal portion 40 and vertical portion 38 can have additional or fewer bolt hole openings for additional attachments. The first side arm mount 18 can be constructed to include a wire opening matching the wire opening 23. The large opening 33 can be constructed to be a trunk fork opening similar to the trunk fork arms 12 of the trunk 4.

Figure 5A:
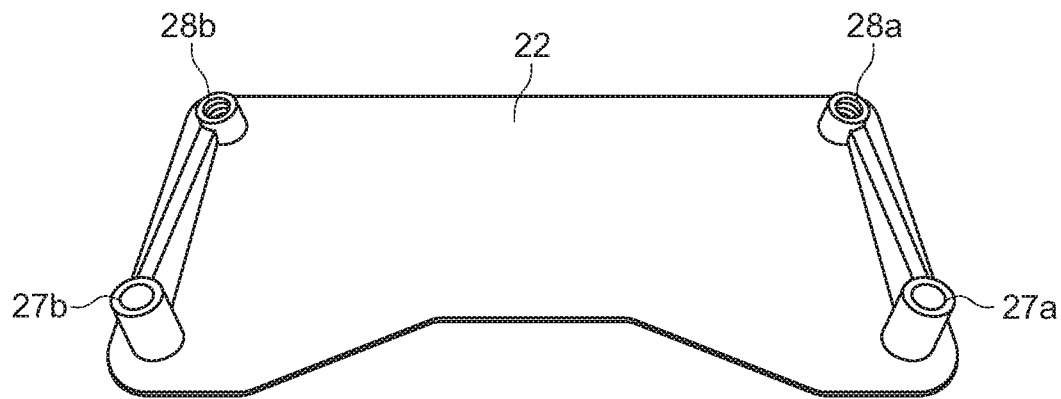
FIG. 5a is a front perspective view of the bottom of the center mount.
Figure 5B:
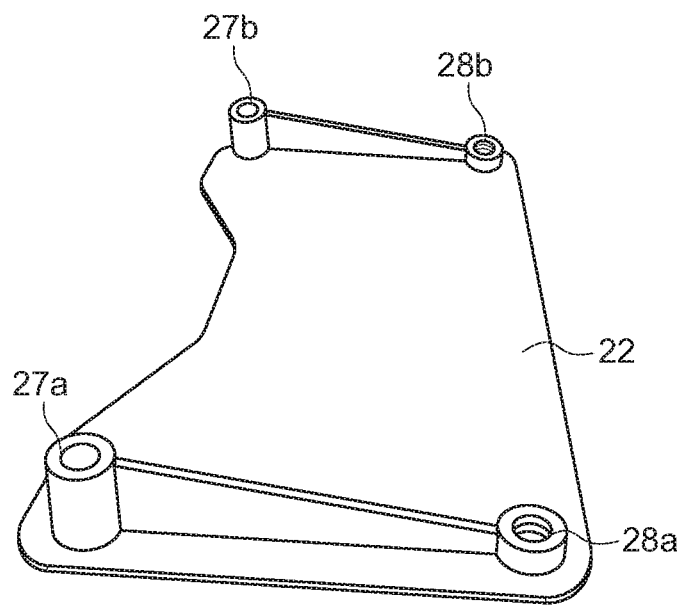
FIG. 5b is a side perspective view of the bottom of the center mount.

Illustrated in FIGS. 5A and 5B is the bottom of the center mount 22. The center mount 22 has a pair of frame bolt holes 27a, 27b and a pair of trunk bolt holes 28a, 28b. The frame bolt holes 27a, 27b have preferably ¾ inch risers that elevate the center mount 22 when installed. The trunk bolt holes 28a, 28b have preferably 6×1 mm nuts to provide for attachment. While the bottom of the center mount 22 has elevated bolt holes 28a, 28b, 27a, 27b, the top of the center mount 22 is flat. In alternative embodiments there can be additional or fewer bolt holes for additional attachments and the bolt hole risers can be of different heights.

Figure 6:
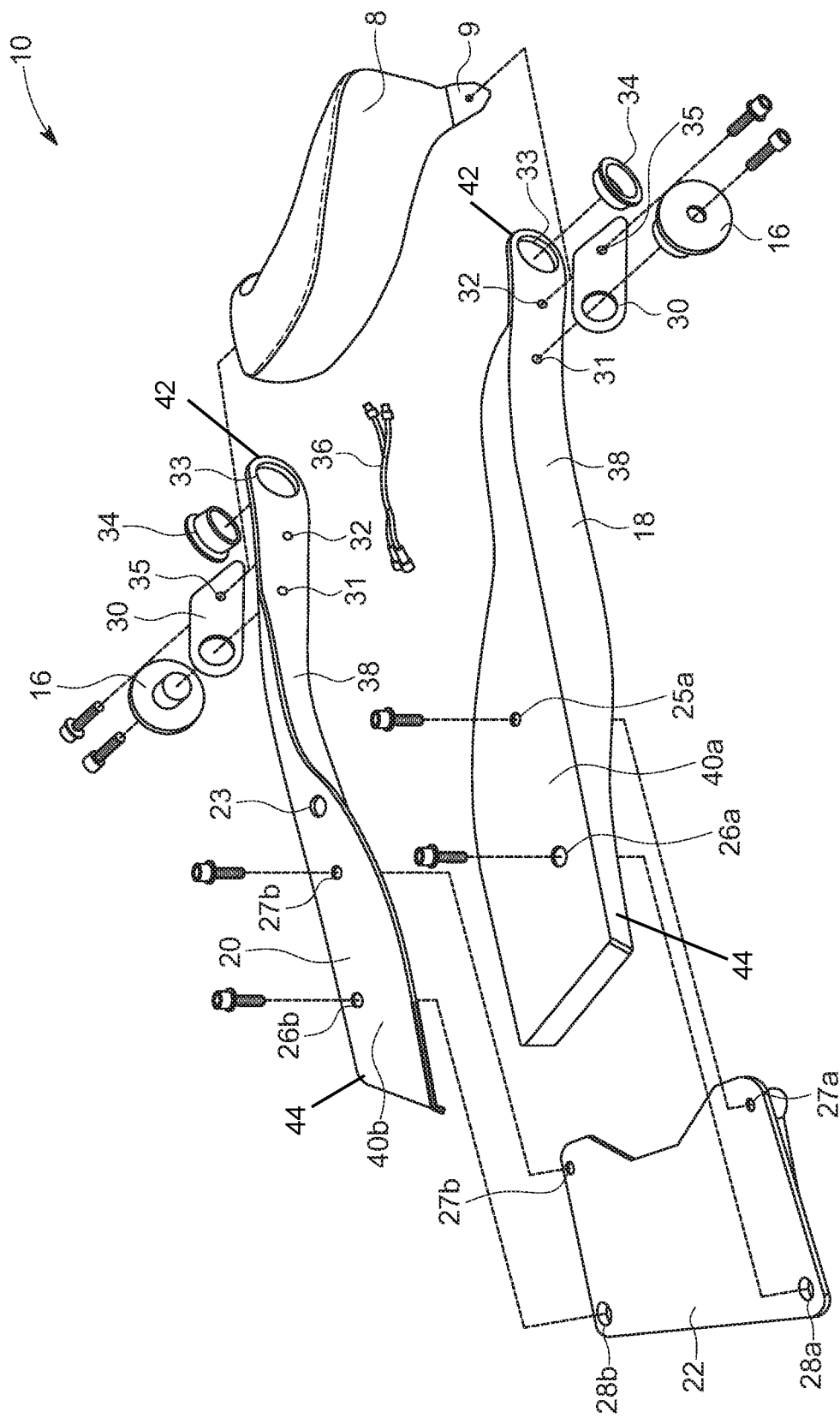
FIG. 6 is a side perspective view of the uninstalled components of the seat back/trunk extension device.

FIG. 6 illustrates the uninstalled components of the seat back/trunk extension device 10. The seat back/trunk extension device has primarily three pieces which include: a first side arm mount 18, a second side arm mount 20, and a center mount 22; and also has multiple attachments including an attachable seat cushion 8. The first side arm mount 18 and second side arm mount 20 are constructed to mirror each other, with their horizontal portions 40a, 40b extending towards each other at a midline at the second end 44. The attachments on each side are similar. The first side arm mount 18 and second side arm mount 20 have protrusion openings 33, at the first end 42 in their vertical portions 38, that fit the dimensions of the original frame protrusions 14. In a preferred embodiment, a bushing 34 is inserted into the protrusion openings 33 to adequately space the side arm mounts 18, 20 to be a similar depth as the trunk fork arm 12. The first side arm mount 18 and second side arm mount 20 attach at the rear to the center mount 22. The center mount 22 acts as a tie plate for the first side arm mount 18 and second side arm mount 20. The frame bolt holes 25a, 25b of the side arm mounts 18, 20 correspond to the frame bolt holes 27a, 27b of the center mount 22. The trunk bolt holes 26a, 26b of the side arm mounts 18, 20 correspond to the trunk bolt holes 28a, 28b of the center mount 22.

An appended protrusion 16a, 16b attaches to the first bolt holes 31a, 31b, on the exterior of the vertical portions 37 of the side arm mounts 18, 20. In a preferred embodiment the appended protrusions are bolted to the side arm mounts however the appended protrusions 16 can be attached to the side arm mounts 18, 20 by screws or can be permanently attached. The appended protrusions are sized appropriately to attach to the trunk fork arms 12. A seat retaining clip 30 attaches around the appended protrusion 16. The seat retaining clip 30 has a small opening 35 to secure the seat flange 9 of the seat cushion 8 to the seat back/trunk extension device 10. When the seat retaining clip 30 is attached to the appended protrusion 16, the position of the small opening 35 corresponds to the second bolt hole 32 of the side arm mounts 18, 20. In a preferred embodiment the seat flange 9 is secured by a bolt but can be secured by other methods known in the art. This seat retaining clip 30 can be a flexible plastic material or a metal material such as aluminum. The seat flange 9 can also be directly attached to the second opening 32 without the seat retaining clip 30.

An extension wire 36 is utilized to connect the power from the frame 3 to a USB port located in the trunk 4. The extension wire 36 extends through the wire opening 23 in the second side arm mount 20.

Figure 7:
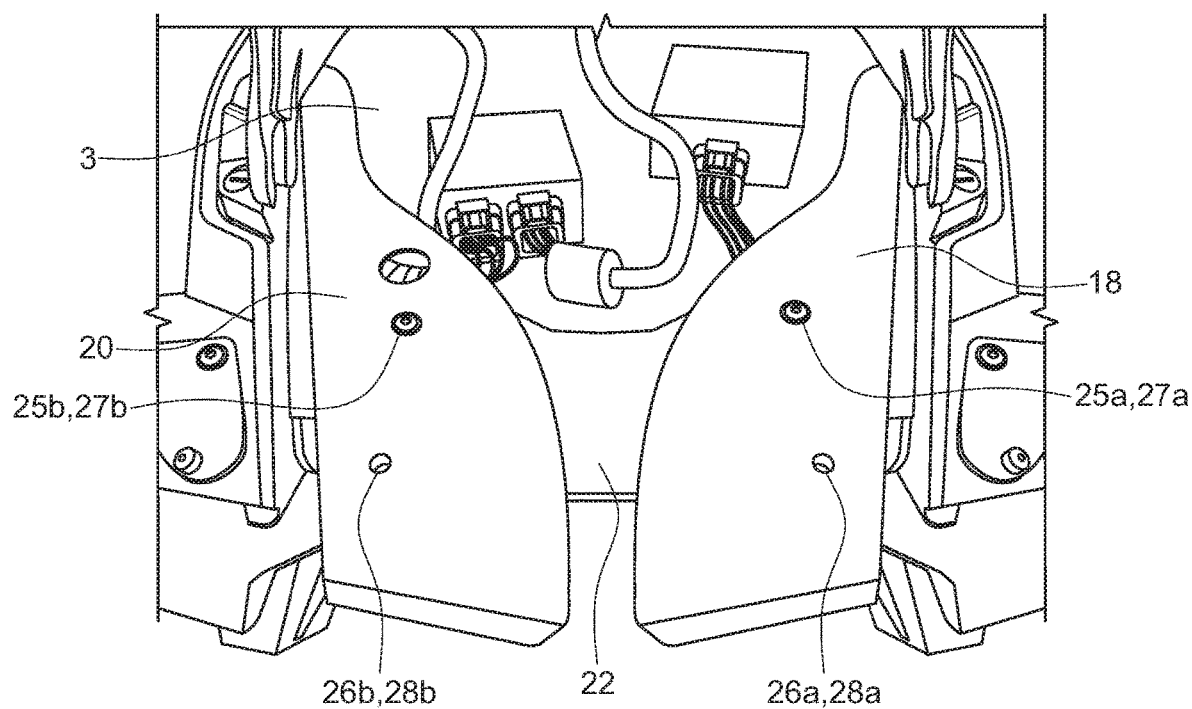
FIG. 7 a top perspective view of the seat extension device installed without the trunk attached.

FIG. 7 illustrates a horizontal platform created by the seat/trunk extension device. A first side arm mount 18 and a second side arm mount 20 extend back from their attachment points at the frame protrusions and extend towards the center of the frame 3, and are attached to a center mount 22. The frame bolt holes 25a, 25b of the side arm mounts and the frame bolt holes 27a, 27b of the center mount 22 are located in a position where existing bolt holes in the frame are intended for use in securing the trunk to the frame. Bolts are utilized to fasten the side arm mounts to the frame through the frame bolt holes 25a, 25b of the side arm mounts 18, 20 via the frame bolt holes. Bolts preferably attach the center mount to the frame via frame bolt holes. Trunk 4 is fastened to the trunk bolt holes 26a, 26b of the side arm mounts 18, 20 and the trunk bolt holes 28a, 28b of the center mount 22.

Figure 8:
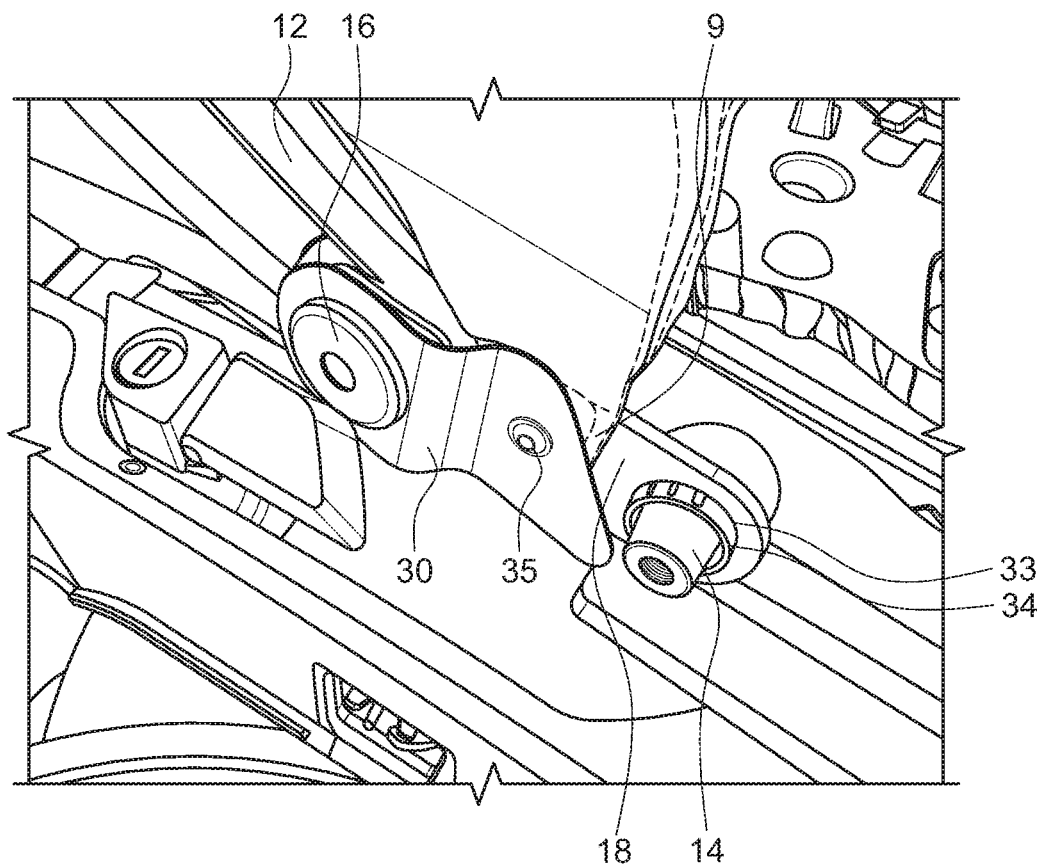
FIG. 8 is a side perspective view of the seat back/trunk extension device installed without the passenger handle grips installed.

FIG. 8 depicts partially installed seat back/trunk extension device. First side arm mount 18 is attached to the original frame protrusion 14 at the protrusion opening 33. Bushing 34 adds depth to the first side arm mount 18 to match the depth of the trunk fork arm 12, and the bushing 34 is inserted within the protrusion opening 33. The appended protrusion 16 is bolted to the first side arm mount 18, with the trunk fork arm 12 attached to the appended protrusion 16. The seat retaining clip 30 is attached to the appended protrusion 16 and positioned to the exterior of the trunk fork arm 12 of the appended protrusion 16. The seat retaining clip extends forward past the second bolt hole 32 of the first side arm mount 18. The seat cushion flange is secured in place between the seat retaining clip bolt hole 35 and the second bolt hole 32 of the first side arm mount 18. In the preferred embodiment the seat cushion flange 9 is bolted between the seat retaining clip 30 and the side arm mount 18.

Figure 9:
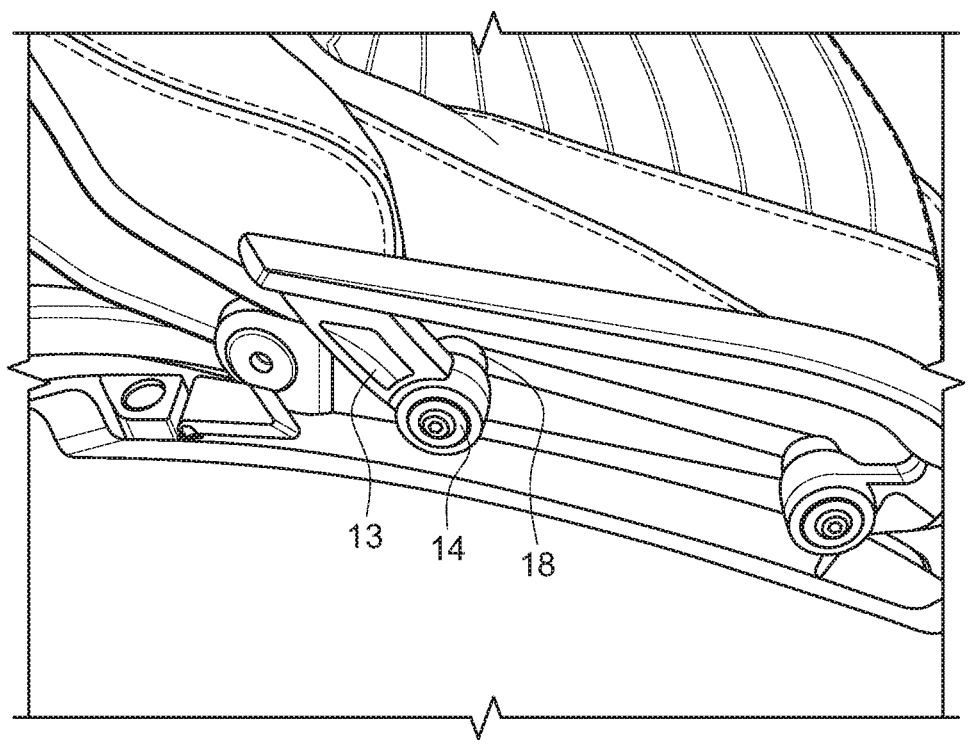
FIG. 9 is a side perspective view of the seat back/trunk extension device installed with the passenger handle grips attached to the original trunk fork frame protrusion.

FIG. 9 depicts an installed seat back/trunk extension device. Handle grips 13 bolt into the original frame protrusion 14, securing the first side arm mount 18 in position.

In an alternative embodiment, multiple attachments can be configured to attach to the seat back/trunk extension device. Such attachments may include but are not limited to arm rests for the passenger, cup holders, or travel bags. These may attach to the side arm mounts in a similar fashion to the seat cushion, or in a similar fashion as the handle grips attach over the trunk fork protrusion.

While the seat back/trunk extension device is primarily intended for the Can-Am Spyder F3®, it can also be modified to fit to other Can-Am Spyder models or other straddle seat type motorcycles without deviating from the scope of the invention(s) discussed herein and depicted.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

What is claimed is:

1. A seat extension device configured for extending a seat positioned on a motorcycle frame, wherein said motorcycle frame comprises a front end and a back end and frame protrusions on opposing sides of said frame, said frame protrusions are configured for attaching a set of trunk fork arms, said trunk fork arms configured to position a trunk in a first position, wherein said seat extension device comprises:
a platform mount configured for positioning said trunk in a second position, said platform mount configured for attachment to said frame protrusions, said platform mount comprising a first side arm, a second side arm, and a cross piece connecting said first side arm and said second side arm;
wherein said first side arm and said second side arm each comprising a rigid body being of sufficient length such that said first side arm and said second side arm are configured to extend past the back end of said motorcycle frame, wherein said first side arm and said second side arm each comprise a first end and a second end, wherein said first side arm and said second side arm are oriented in a generally parallel arrangement;
wherein said first ends of said first side arm and said second side arm are configured for attachment to said frame protrusions;
wherein said first side arm and said second side arm are connected to said cross piece at said second ends of said first side arm and said second side arm, wherein said cross piece extends between said first side arm and said second side arm so as to be oriented normal to said first side arm and said second side arm,
wherein said platform mount is configured such that when a first end of said platform mount is attached to said motorcycle frame, a second end of said platform mount is configured to extend passed said back end of said motorcycle frame;
wherein each of said first side arm and said second side arm comprise at least one secondary frame protrusion configured for attaching said trunk arm mounts such that said trunk is in a second position and defining a space between said trunk and said seat of said motorcycle, wherein said trunk is secured to said second end of said platform; and
a seat cushion extension having a first end and a second end, said seat cushion extension being configured for attachment to said first ends of said first arm and said second arm, wherein said seat extension substantially fills said space.

2. The seat extension device of claim 1 wherein said platform mount comprises openings configured for receiving fasteners to attach said platform mount to said motorcycle frame.

3. A seat extension device for use with a motorcycle comprising a frame and defining a seating area having a rear limit defined by a trunk, wherein said seat extension is configured for extending the length of said seating area of said motorcycle by positioning said trunk in a extended position, said seat extension device comprising:
a first side arm mount, a second side arm mount, and a center mount;
wherein said first side arm mount and said second side arm mount each comprising a rigid body being of sufficient length such that said first side arm mount and said second side arm mount are configured to extend past the rear of said motorcycle frame, and said first side arm mount and said second side arm mount each comprising a first end and a second end;
said first end of said first side arm mount and said first end of said second side arm mount being configured for attachment to said motorcycle frame at protrusions on opposing sides of said motorcycle frame, said motorcycle frame protrusions comprising prepositioned protrusions originally configured to attach to a set of arm mounts for a trunk to position said trunk in a first position;

wherein said center mount comprising a rigid body having a length configured to span a width between said second end of said first side arm mount and said second end of said second side arm mount when said first side arm mount and said second side arm mount are attached to said motorcycle frame;

wherein said first side arm mount and said second side arm mount are configured to attach to said center mount at said second end of said first side and said second end of said second side arm mount, wherein said first side arm mount, said second side arm mount and said center mount are configured to define a platform when connected to one another and when connected to said motorcycle frame;

wherein when said platform is attached to said motorcycle frame at a first end of said platform said platform is configured to have a second end extending past said rear of said frame;

wherein said first side arm mount and said second side arm comprising secondary frame protrusions to attach to said arm mounts for said trunk, positioning said trunk in a second position, defining a space between said trunk and a seat of said motorcycle, wherein said trunk being secured to said second end of said platform; and a seat cushion having a first end and a second end, said seat cushion spanning the width between said first side arm mount and said second side arm mount, said seat cushion being configured to attach to said first side arm mount at said first end and said seat cushion being configured to attach to said second side arm mount at said second end, said seat cushion being configured to occupy said space between said trunk and said seat.

4. The seat extension device of claim 3 wherein said platform mount further comprising trunk openings configured for receiving fasteners to attach said trunk to said platform mount.

5. The seat extension device of claim 4, wherein said rigid body of said second side arm mount defines an opening configured for a power extension cable to extend from said frame to said trunk.

6. The seat extension device of claim 4, wherein said first side arm mount and said second side arm mount are comprises openings configured for fastening of additional attachments to said first side arm mount and said second side arm mount.

7. The seat extension device of claim 4, wherein said first side arm mount and said second side arm mount are configured to fasten to said center mount via multiple fasteners.

8. The seat extension device of claim 4, wherein said trunk is configured to secure to said second end of said platform through pre-existing fastener openings in said trunk.

9. The seat extension device of claim 4, wherein said platform is attached to said frame through pre-existing bolt holes in said frame.

10. The seat extension device of claim 4, wherein said seat extension device is configured for attachment to a three wheeled motorcycle.

* * * * *